US011222004B2

(12) United States Patent
Mecozzi et al.

(10) Patent No.: US 11,222,004 B2
(45) Date of Patent: Jan. 11, 2022

(54) MANAGEMENT OF A DATABASE WITH RELOCATION OF DATA UNITS THEREOF

(71) Applicant: INTERNATIONAL BUSINESS MACHINES CORPORATION, Armonk, NY (US)

(72) Inventors: Catia Mecozzi, Rome (IT); Nicola Milanese, Rome (IT); Stefano Sidoti, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 246 days.

(21) Appl. No.: 15/342,224

(22) Filed: Nov. 3, 2016

(65) Prior Publication Data

US 2018/0121489 A1    May 3, 2018

(51) Int. Cl.
*G06F 16/23* (2019.01)
*G06F 16/21* (2019.01)
*G06F 11/34* (2006.01)
*G06F 16/27* (2019.01)
*G06F 11/30* (2006.01)

(52) U.S. Cl.
CPC ...... *G06F 16/2365* (2019.01); *G06F 11/3055* (2013.01); *G06F 11/3442* (2013.01); *G06F 16/21* (2019.01); *G06F 16/27* (2019.01); *G06F 2201/80* (2013.01)

(58) Field of Classification Search
CPC ......... G06F 17/30306; G06F 17/30339; G06F 17/30575; G06F 11/3442
See application file for complete search history.

(56) References Cited

U.S. PATENT DOCUMENTS

| | | | |
|---|---|---|---|
| 7,941,510 B1 * | 5/2011 | Tormasov et al. .... | G06F 15/177 |
| 8,010,337 B2 | 8/2011 | Narayanan et al. | |
| 8,200,659 B2 | 6/2012 | Zibitsker | |

(Continued)

OTHER PUBLICATIONS microsoft.com "Optimizing Database Performance Overview", 2016 Microsoft; retrieved from URL: https://technet.microsoft.com/en-US/library/aa178001%28v=sql.80%29.aspx; 1 pg.

(Continued)

*Primary Examiner* — James Trujillo
*Assistant Examiner* — J Mitchell Curran
(74) *Attorney, Agent, or Firm* — Cantor Colburn LLP; Jeffrey S LaBaw

(57) ABSTRACT

A solution is proposed for managing a database, which comprises one or more data units stored in one or more of a plurality of computing machines. A corresponding method comprises monitoring one or more machine parameters relating to operation of each computing machine over time, monitoring one or more unit parameters relating to operation of each data unit on the corresponding computing machine over time, detecting a relocation condition corresponding to a missing fulfillment of one or more targets according to the monitored unit parameters, and determining a proposed relocation of the data units in the computing machines removing the missing fulfillment of the targets according to the monitored unit parameters and the monitored machine parameters for use in relocating the data units accordingly.

14 Claims, 7 Drawing Sheets

(56) References Cited

U.S. PATENT DOCUMENTS

| | | | |
|---|---|---|---|
| 8,209,699 B2 | 6/2012 | Ferguson et al. | |
| 9,043,569 B2* | 5/2015 | Dell et al. | G06F 12/00 |
| 9,804,993 B1* | 10/2017 | Brooker et al. | G06F 15/167 |
| | | | 707/212 |
| 9,836,243 B1* | 12/2017 | Chanler et al. | G06F 12/00 |
| 2004/0088314 A1 | 5/2004 | Simes | |
| 2006/0136370 A1* | 6/2006 | Buckler | G06F 17/30 |
| 2010/0030729 A1* | 2/2010 | Hsu | G06F 16/00 |
| | | | 707/721 |
| 2013/0297655 A1 | 11/2013 | Narasayya et al. | |
| 2013/0304774 A1* | 11/2013 | Tan et al. | G06F 17/30 |
| 2016/0197844 A1* | 7/2016 | Smith | H04L 41/5041 |
| | | | 709/226 |

OTHER PUBLICATIONS

Pearson, Dave Proactive Performance Management for Enterprise Databases: Quest Software Smart Systems Management White Paper; 2010 Quest Software, Inc., retrieved from URL: http://www.dlt.com/sites/default/files/Quest-Proactive-PerfManage-4-Enterprise-WP.pdf; 13 pgs.

\* cited by examiner

MANAGEMENT OF A DATABASE WITH RELOCATION OF DATA UNITS THEREOF

BACKGROUND

The present disclosure relates to the information technology field. More specifically, this disclosure relates to the management of databases.

Databases are commonly used to store large amount of data in structured form (for example, organized in schemas, tables and views in relational databases). Each database defines the data at a logical, or conceptual, level (on top of which different external views may be defined for corresponding end-users); this logical level abstracts the data from their actual representation at a physical, or internal, level. The (physical) data are instead stored in corresponding data units, or sub-units (for example, files). Particularly, especially in large databases, the data are split throughout multiple data units. In this way, it is possible to store any amount of data, even exceeding the size limit of the single data units; moreover, this allows optimizing the distribution of the data to increase performance of the database.

A critical activity in the management of the databases is the definition of the corresponding data units and of their locations (for example, in corresponding server computing machines, or simply servers). Indeed, any data unit requires corresponding resources in its server to operate correctly (for example, mass memory space); moreover, the location of the data units may impact the performance of the database (for example, with potentially contending data units that may work concurrently to process the corresponding data when they are stored in different servers, whereas this is not possible when they are stored in the same server). It should be added that any change of the configuration of the data units (i.e., their definition and/or location) generally requires putting them offline for the whole period required to apply the desired changes (during which the corresponding data are unavailable); therefore, the frequency of this operation should be reduced as far as possible. All of the above is particularly important in databases that are highly dynamic or with operative characteristics that are not known a priori.

In case of any problems in the database (for example, failure or poor performance thereof) information may be collected manually from it; this information facilitates the task of solving the problems by a database administrator (for example, for relocating the data units).

However, the information that may be collected from the database only relates to the servers wherein the data units are currently stored. Other tools (for example, load-balancing tools) are instead required to collect information relating to any other server, which may be potentially available to store the data units. In any case, the information that is collected from the database and from these other tools is completely uncorrelated.

Moreover, the information collected from the database is defined by a high amount of raw data (for example, several metrics relating to several features); these raw data may be quite difficult to interpret (because of the number of features to manage and the number of metrics to understand). Therefore, the task of solving the problems strongly depends on personal skills of the database administrator. However, this increases the time required to solve the problems and the intrinsic risk of every change that is applied to the database (with the possibility of not solving the problems, to have the same problems occurring in the near future or to introduce new problems).

In any case, the database administrator may react to the problems only after they have occurred. Therefore, any intervention on the database aimed at solving them does not prevent corresponding negative impacts on any applications supported by it (and then on their service level); for example, corresponding end-users may experience downtimes or significant performance degradations for a quite long period.

SUMMARY

Embodiments include methods, systems and computer program products for managing a database (comprising one or more data units stored in one or more of a plurality of computing machines), wherein one or more machine parameters relating to operation of each computing machine over time and one or more unit parameters relating to operation of each data unit on the corresponding computing machine over time are monitored, and a proposed relocation of the data units in the computing machines is determined according to the monitored machine parameters and unit parameters.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

With reference in particular to FIG. 1A-FIG. 1D, the general principles are shown of the solution according to an embodiment of the present disclosure.

Figure 1A:
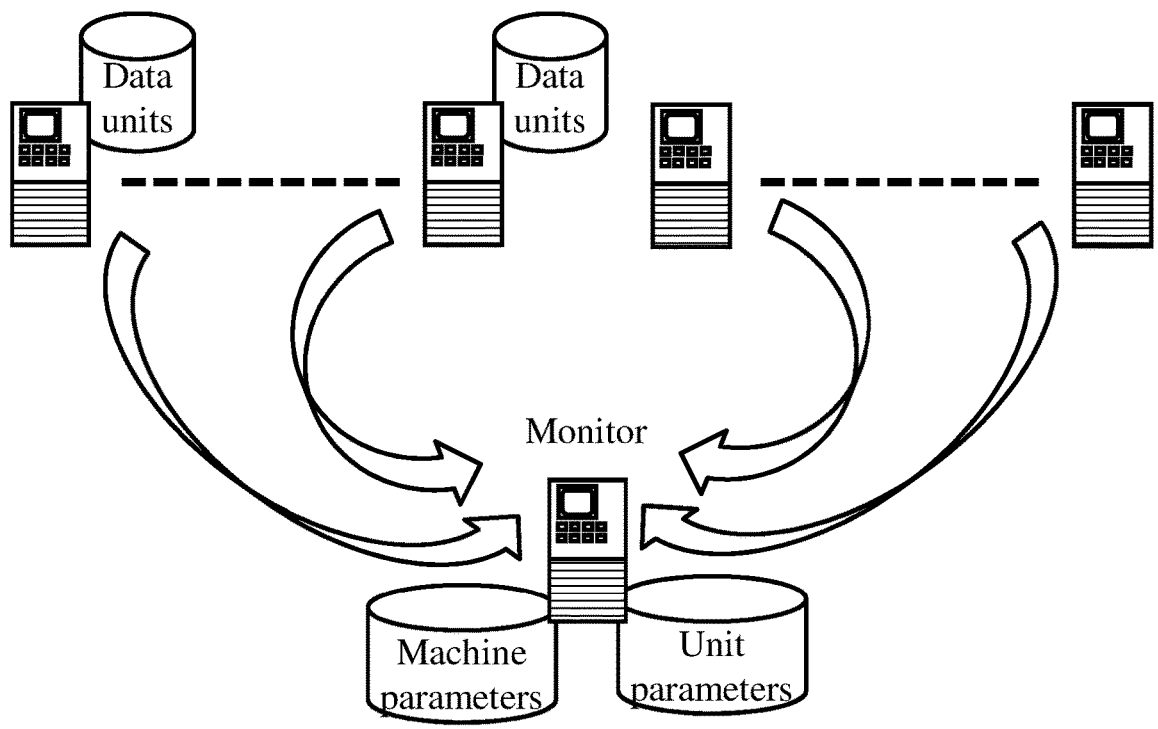
FIGS. 1A, 1B, 1C and 1D show the general principles of the solution according to an embodiment of the present disclosure.

Starting from FIG. 1A, a generic database comprises logical data (for example, tables) that are stored in one or more physical structures (data units), such as files; examples of these data units in commercial databases are tablespaces in DB2 by IBM Corporation and filegroups in MSSQL by Microsoft Corporation (trademarks thereof). The data units are located (i.e., stored) in one or more computing machines, for example, (data) servers; these servers are selected among a plurality of servers that are available for this purpose. One or more machine parameters are monitored for every one of the servers (independently of whether they store any data unit or not); the machine parameters relate to operation of the server (for example, relating to free resources and performance thereof). Moreover, one or more unit parameters are monitored for each data unit; the unit parameters relate to operation of the data unit in the corresponding server (for example, consumed/free resources and performance thereof).

Figure 1B:
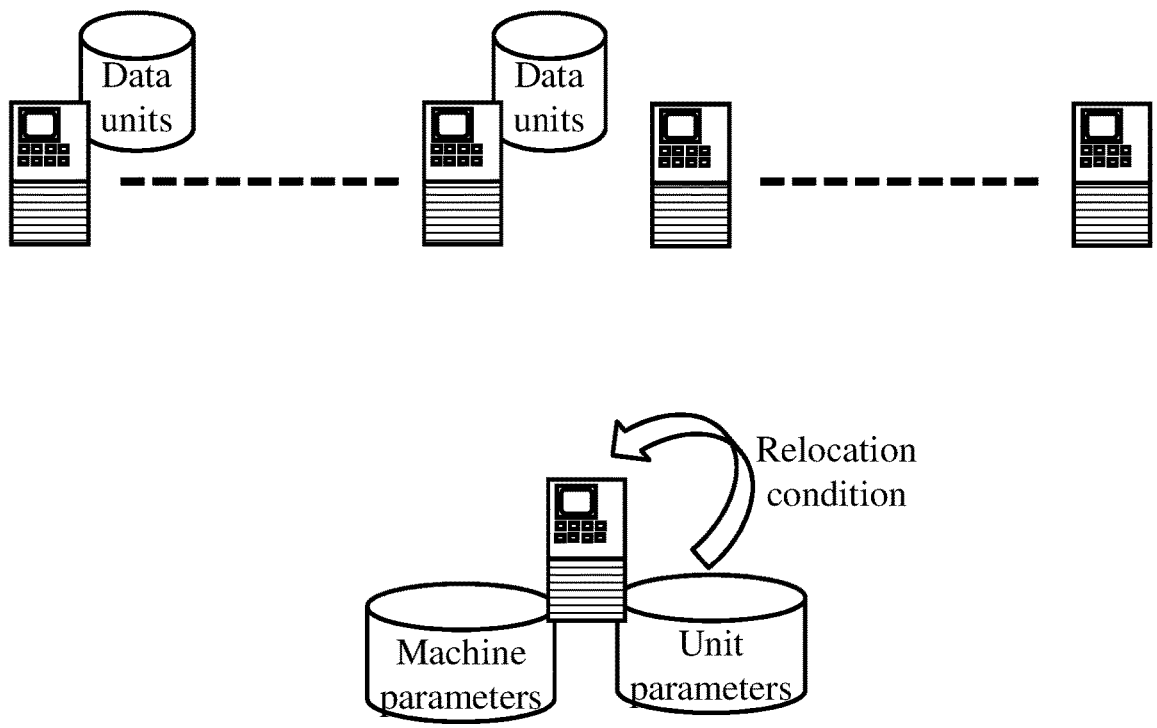

Moving to FIG. 1B, a relocation condition is detected. The relocation condition corresponds to the missing fulfillment of one or more targets according to the (monitored) unit parameters; for example, this happens when one or more unit parameters reach corresponding thresholds, or they are likely to reach them in the near future (such as the amount of a free resource or an index of performance being too low).

Figure 1C:
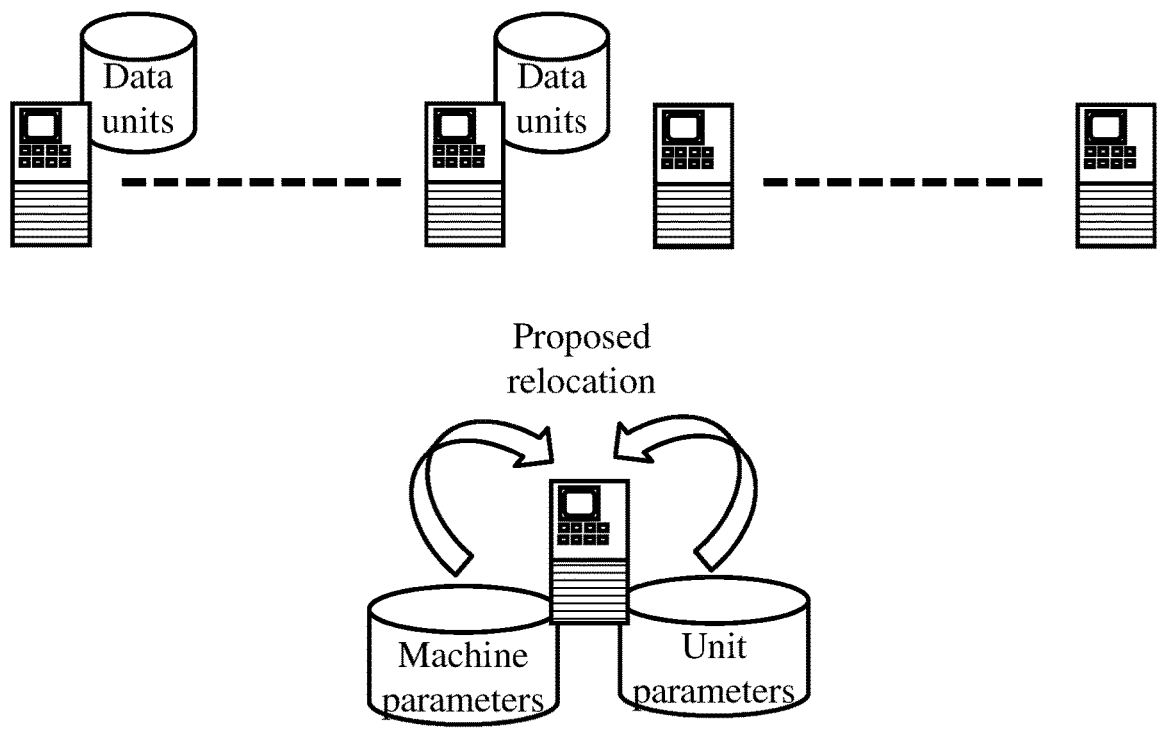

Moving to FIG. 1C, a proposed relocation of the data units in the servers is determined; for example, the proposed relocation corresponds to the (complete or partial) movement of each (critical) data unit, causing the missing fulfillment of the targets, from its server to another one. The proposed relocation is determined so as to remove the missing fulfillment of the targets according to the (monitored) unit parameters and the (monitored) machine parameters; for example, each critical data unit is moved to another server wherein the free resources and the performance of the critical data unit (determined according to the free resources and the performance of the other server and the consumed resources of the critical data unit) do not reach the corresponding thresholds any longer and they are not likely to reach them in the near future.

Figure 1D:
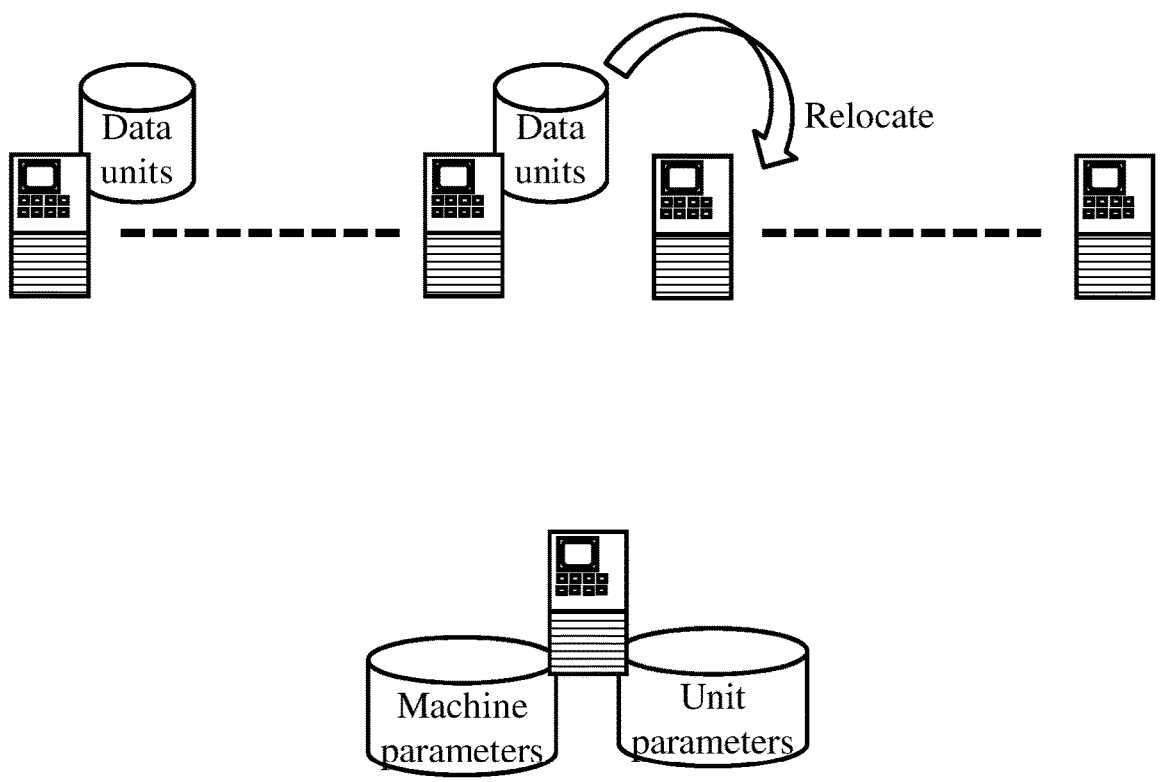

Moving to FIG. 1D, the critical data units may be relocated accordingly. For example, a warning for the relocation condition is provided and an indication of the proposed relocation is displayed; this information may then be used to move (completely or in part) each critical data unit as indicated in the proposed relocation (for example, manually by a corresponding database administrator).

The above-described solution significantly facilitates the task of managing the database, with reference to the definition and location of its data units. This reduces the risk that the database does not operate correctly and it increases its performance; as a result, the frequency of the changes to the data units of the database (and then the corresponding periods during which they are unavailable) may be reduced. These advantages are particularly perceived in databases that are highly dynamic or with operative characteristics that are not known a priori.

Moreover, the proposed relocation of the data units is based on information relating not only to the servers wherein the data units are currently stored, but also to any other servers that are potentially available to store the data units. This result is achieved by combining information at different levels, i.e., unit parameters relating to the data units (middleware level) and machine parameters relating to the servers (system level).

All of the above reduces any dependency of the task of managing the database on human factors, like personal skills (thereby fostering its automation); this significantly reduces the time required to solve any problems and the intrinsic risk of any change that is applied to the database, with a beneficial impact on its performance.

Figure 2:
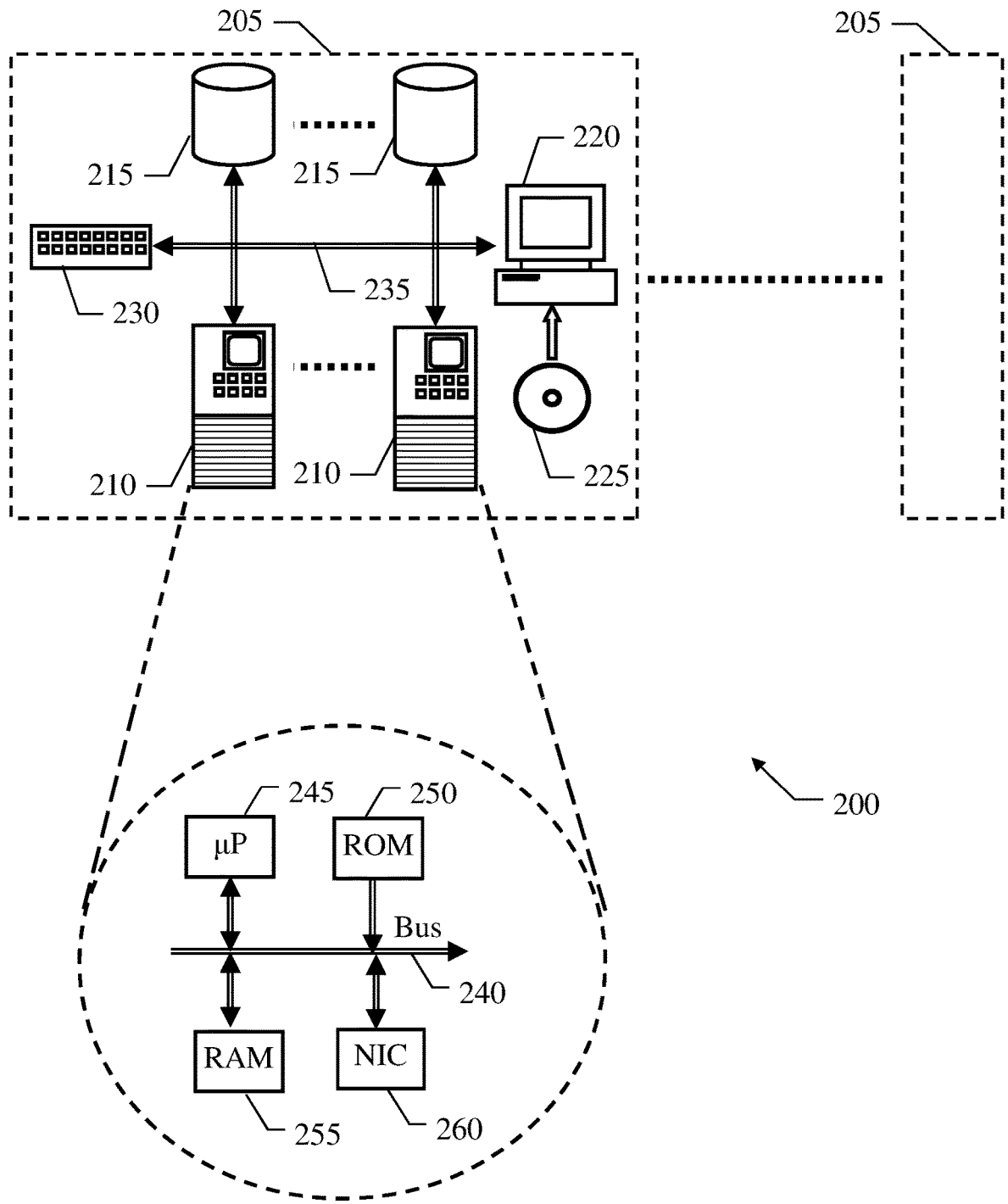
FIG. 2 shows a schematic block diagram of a computing system wherein the solution according to an embodiment of the present disclosure may be practiced.

With reference now to FIG. 2, a schematic block diagram is shown of a computing system 200 wherein the solution according to an embodiment of the present disclosure may be practiced.

The (computing) system 200 is implemented by one or more server farms 205. Each server farm 205 comprises several server computing machines, or simply servers, 210 (for example, of the rack or blade type) and storage disks 215 (for example, of the RAID type) implementing mass-memories thereof; the server farm 205 also comprises a console 220 for controlling it (for example, a personal computer, also provided with a drive for reading/writing removable storage units 225, such as optical disks like DVDs). A switch/router sub-system 230 manages any communications among the servers 210, the disks 215 and the console 220 and with a communication network, not shown in figure (in particular, for allowing communication among the servers 210); for this purpose, the servers 210, the disks 215 and the console 220 are connected to the switch/router sub-system 230 through a cabling sub-system 235.

Each server 210 comprises several units that are connected in parallel to a bus structure 240. Particularly, one or more microprocessors ($\mu$P) 245 control operation of the server 210; a non-volatile memory (ROM) 250 stores basic code for a bootstrap of the server 210 and a volatile memory (RAM) 255 is used as a working memory by the microprocessors 245. Moreover, the server 210 is provided with a network adapter (NIC) 260, which is used to plug the server 210 into the cabling sub-system 235.

Figure 3:
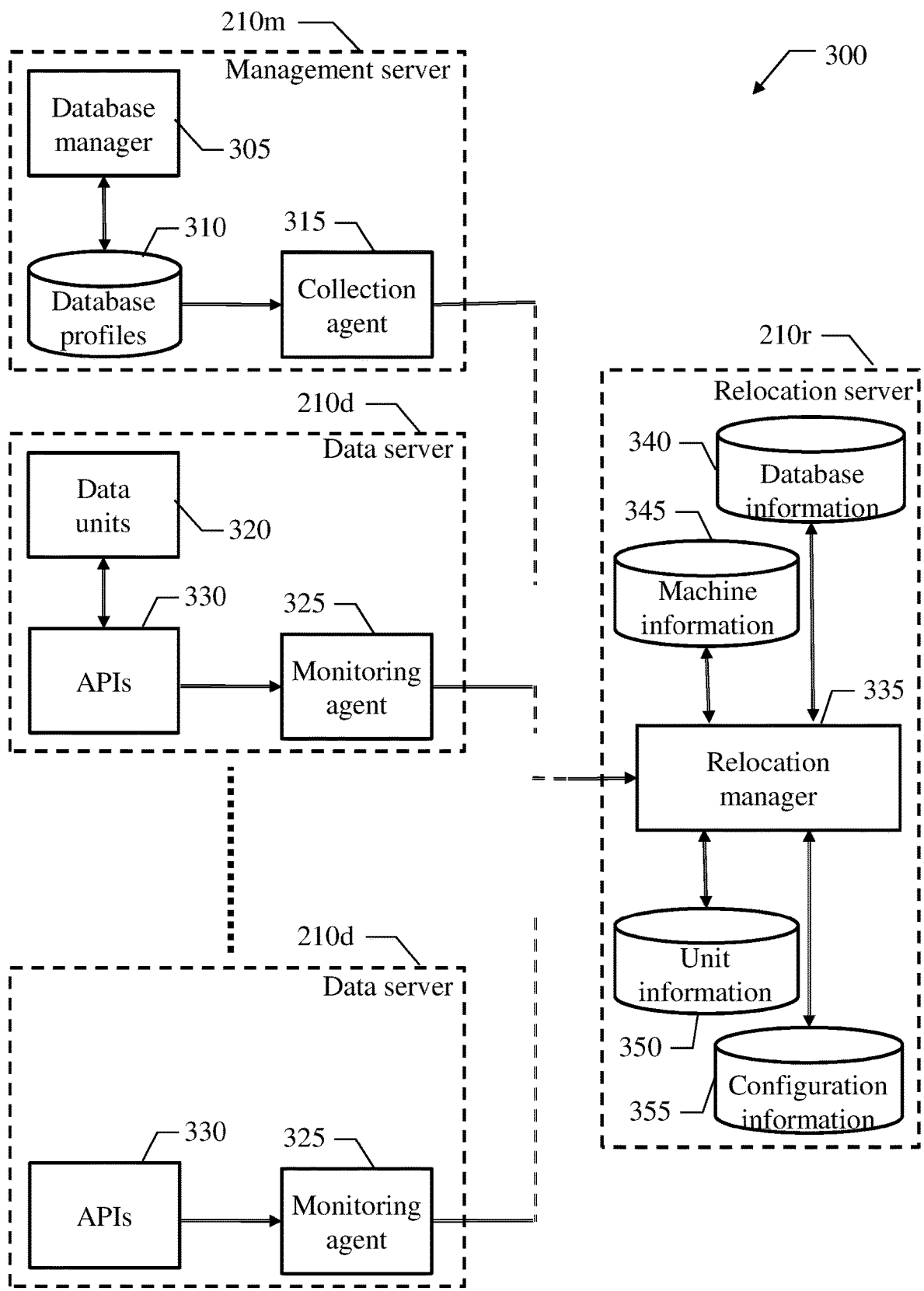
FIG. 3 shows the main software components that may be used to implement the solution according to an embodiment of the present disclosure.

Moving to FIG. 3, the main software components are shown that may be used to implement the solution according to an embodiment of the present disclosure.

Particularly, all the software components (programs and data) are denoted as a whole with the reference 300. The software components are typically stored in the mass memory and loaded (at least partially) into the working memory of each server when the programs are running, together with an operating system and other application programs (not shown in the figure). The programs are initially installed into the mass memory, for example, from removable storage units or from the communication network. In this respect, each program may be a module, segment or portion of code, which comprises one or more executable instructions for implementing the specified logical function.

Particularly, a server (or more), referred to as management server and differentiated with the reference 210$m$, runs a database manager 305 that manages one or more databases (storing data in structured form); for example, the database manager 305 is a Relational DataBase Management System (RDBMS) in case of databases of relational type (wherein the data are organized in tables). The database manager 305 provides a logical view of the databases (in terms of their tables in this case), hiding a physical implementation thereof. For this purpose, the database manager 305 controls (in read/write mode) a profile repository 310 that stores a profile of each database. As far as relevant to the present disclosure, the profile repository 310 comprises information relating to the performance of the database (for example, number of read operations per time unit, number of writing operations per time unit and average length of queries for each table). Moreover, the profile repository 310 comprises information relating the (one or more) data units that store the (logical) data of the database physically (for example, in corresponding files); particularly, the profile repository 310 indicates the location of each data unit, i.e., the server where the data unit is stored. In the solution according to an embodiment of the present disclosure, the management server 210*m* also runs a collection agent 315, which is used to collect information to be used for implementing the relocation of the data units of each database (as described in the following); for example, this information comprises the location of each data unit of the database and an ordered list of the (hot) data units storing the (hot) tables with the highest impact on one or more performance aspects. For this purpose, the collection agent 315 accesses (in read mode only) the profile repository 310.

A plurality of servers, referred to as data servers and differentiated with the reference 210*d*, are available to store the data units of the databases managed by the database manager 305, with the data units that are denoted with the reference 320 for the data servers 210*d* wherein they are actually stored. In the solution according to an embodiment of the present disclosure, each data server 201*d* runs a monitoring agent 325, which is used to monitor information to be used for implementing the relocation of the data units of each database (as described in the following); particularly, this information comprises the machine parameters of the data server 210*d* (in any case) and possibly the unit parameters of each data unit 320 that is stored therein (if any). For example, the machine/unit parameters are grouped in one or more sets for corresponding global areas (such as processing, mass memory and working memory). Each global area comprises one or more machine/unit parameters. For example, the machine parameters may measure resources of the corresponding global area that are free in the data server and the unit parameters may measure the same resources that are consumed by the data unit and that are free in the data server for it (for example, processing power, mass memory space, working memory space); moreover, the unit parameters may measure performance aspects of the data unit (for example, average processing time, I/O rate) and the machine parameters may measure characteristics of the data server relevant thereto (for example, microprocessor frequency, mass memory latency, working memory access time). For this purpose, the monitoring agent 325 exploits one or more Application Program Interfaces (APIs) 330 of the operating system of the data server 210*d* (which in turn interfaces with any data units 320).

Another server (or more), referred to as relocation server and differentiated with the reference 210*r*, runs a relocation manager 335 that manages the relocation of the data units of each database (as described in the following). For this purpose, the relocation manager 335 interacts with the collection agent 315 (of the management server 210*m*) and with the monitoring agent 325 (of each data server 210*d*). Moreover, the relocation manager 335 controls (in read/write mode) a database repository 340, a machine repository 345 and a unit repository 350 storing information to be used for implementing the relocation of the data units of each database (as described in the following).

Particularly, for each database the database repository 340 comprises the location of each data unit thereof and the list of its hot data units. The machine repository 345 comprises the values of the machine parameters of each data server 210*d* that have been monitored over time (for example, in the last 1-3 years); moreover, for each machine parameter the machine repository 345 comprises an (estimated) trend thereof (for example, defined by its average changing rate) and any recurring peaks thereof (for example, defined by their average value, time and periodicity). Likewise, the unit repository 350 comprises the values of the unit parameters of each data unit 320 that have been monitored over time (for example, in the same period); moreover, for each unit parameter the unit repository 350 comprises an (estimated) trend thereof and any recurring peaks thereof (for example, defined as above). The relocation manager 335 further controls (in read/write mode) a configuration repository 355 storing configuration information of the relocation manager 335. Particularly, the configuration repository 355 comprises one or more targets for the unit parameters; for example, each target is defined by a (maximum or minimum) threshold for a corresponding unit parameter relating to a free resource or a performance aspect of the data unit (such as minimum free processing power, minimum free mass memory space, minimum free working memory space, maximum average processing time, minimum I/O rate). Moreover, the configuration repository 355 comprises a (movement) granularity of possible movements of the critical data units (for example, 10-20%) and one or more optimization criteria for selecting the proposed relocation (for example, defined by corresponding Key Performance Indicators (KPIs), such as throughput of a customizable number of the hot tables).

Figure 4A:
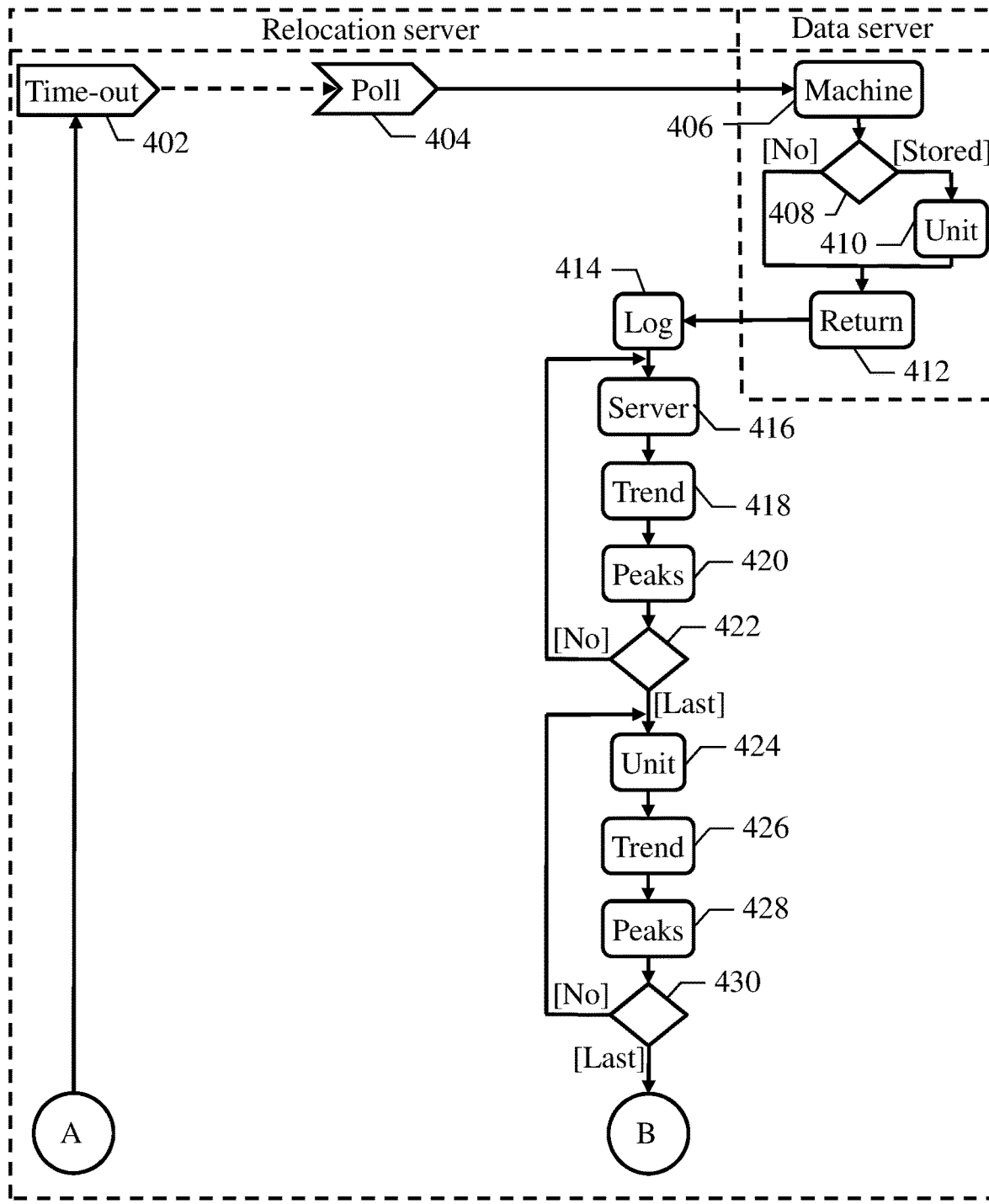
FIGS. 4A, 4B and 4C show an activity diagram describing the flow of activities relating to an implementation of the solution according to an embodiment of the present disclosure.
Figure 4B:
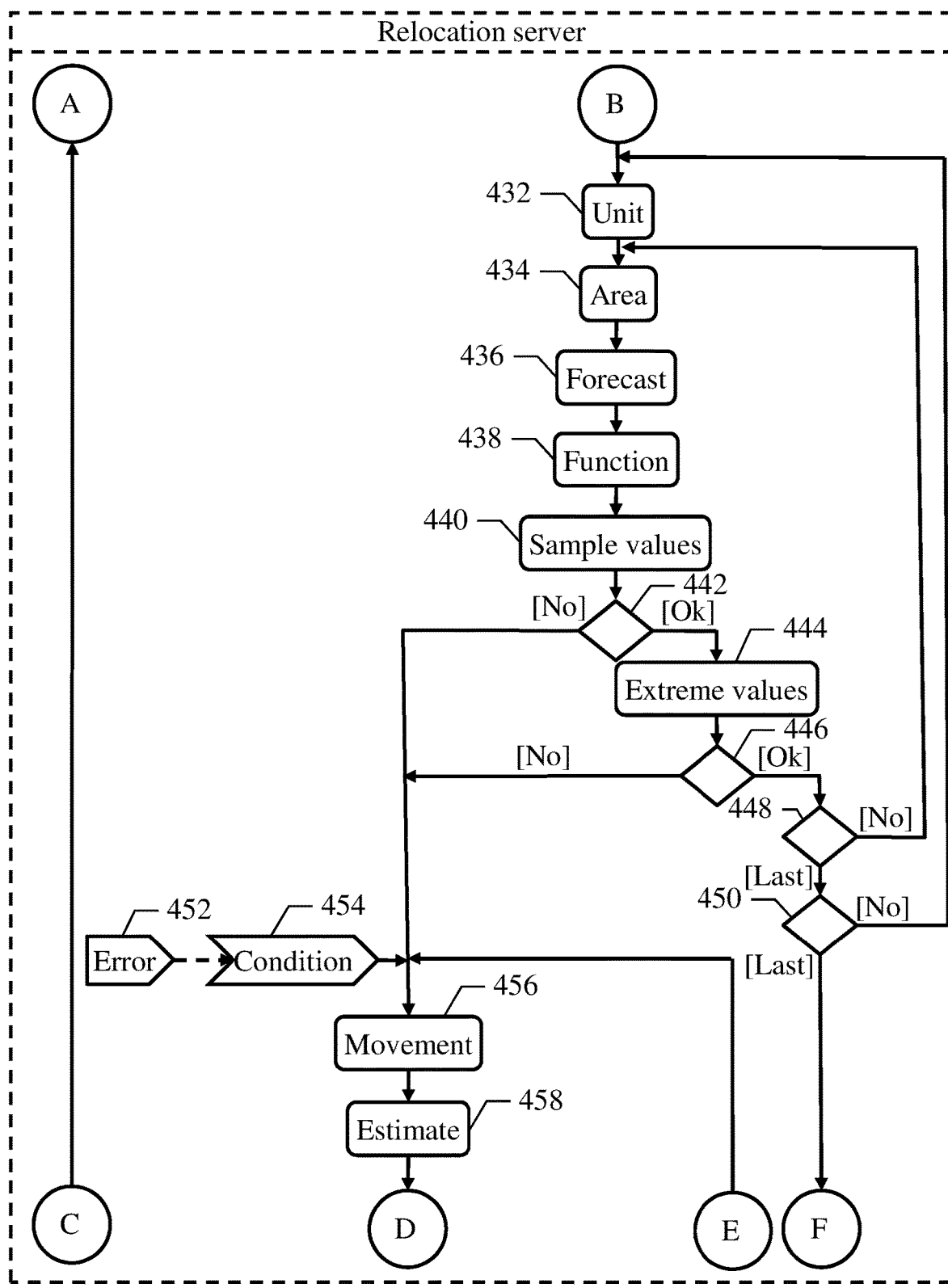
Figure 4C:
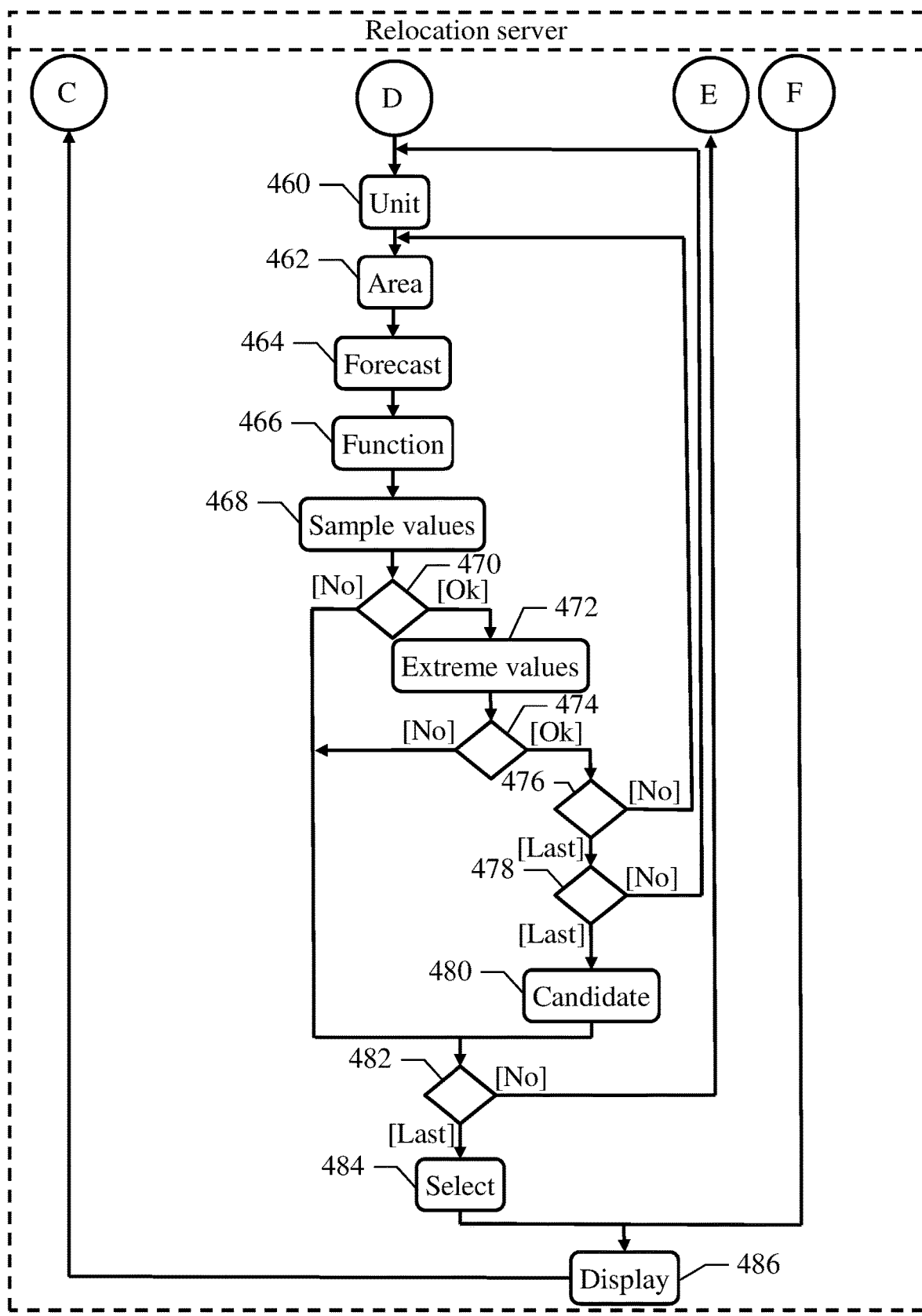

With reference now to FIG. 4A-FIG. 4C, an activity diagram is shown describing the flow of activities relating to an implementation of the solution according to an embodiment of the present disclosure.

Particularly, the diagram represents an exemplary process that may be used to manage a generic database (i.e., its data units) with a method 400. In this respect, each block may correspond to one or more executable instructions for implementing the specified logical function on the relevant computing devices.

Starting from the swim-lane of the relocation server, a loop is performed continuously. Particularly, the process passes from block 402 to block 404 as soon as a corresponding time-out expires (for example, every 1-10 minutes). In response thereto, the relocation manager polls the data servers for monitoring their machine parameters and unit parameters (for example, by submitting a corresponding monitoring request to the monitoring agent of each one of them). Moving to the swim-lane of a generic data server, as soon as its monitoring agent receives the monitoring request (from the relocation server), it collects the (current values of the) machine parameters at block 406, by exploiting the corresponding APIs. The flow of activity then branches at block 408. If the data server stores one or more data units (of the database under management), the monitoring agent likewise collects the (current values of the) unit parameters of each one of these data units at block 410, by exploiting the corresponding APIs. The process then descends into block 412; the same point is also reached directly from the block 408 if the data server stores no data units (of the same database). In both cases, the relocation agent now returns the machine parameters and the unit parameters (if any) that have been collected to the relocation server. Returning to the swim-lane of the relocation server at block 414, the relocation manager logs the machine parameters and of the unit parameters that are received from each data server by adding them to the machine repository and to the unit repository, respectively. Similar operations (not shown in the figure) are performed if one or more unit parameters are monitored by the collection agent of the management server (for example, when they are difficult to collect on the data servers).

The machine/unit parameters received from the data servers are then processed; this operation may be performed either in an asynchronous mode for each data server (as soon as the corresponding machine/unit parameters have been received) or in a synchronous mode for all the data servers (once the machine/unit parameters have been received from them, or in any case after a predefined delay like 20-40 s). In any case, a (current) data server is taken into account at block 416 (i.e., a data server that has just returned its machine/unit parameters in the asynchronous mode or a next data server in any arbitrary order in the synchronous mode). Moving to block 418, the relocation manager estimates the trend of each machine parameter and adds it to the machine repository; for example, the values of the machine parameter that have been monitored over a predefined period, such the last 1-4 weeks (extracted from the machine repository) are best fitted to a straight line (such as by minimizing their orthogonal distance therefrom) and the estimated trend is set equal to the angular coefficient of this straight line.

With reference now to block 420, the relocation manager identifies any recurring peaks of each machine parameter and adds them to the machine repository; for example, generic peaks are defined by any local maximum or minimum (according to the corresponding target) of the same values of the machine parameter significantly departing from the corresponding straight line (such as at least by 30-50%) and the recurring peaks are defined by the generic peaks that repeat substantially periodically (for example, with a period varying at most by 5-10%). A test is then made at block 422, wherein the relocation manager verifies whether the machine parameters of a last data server have been processed. If not, the flow of activity returns to the block 416 to repeat the same operations for a next data server. Conversely (once the machine parameters of all the data servers have been processed, or in any case after the corresponding delay), a (current) data unit is taken into account at block 424 (i.e., a data unit stored in a data server that has just returned its unit parameters in the asynchronous mode or a next data unit in any arbitrary order in the synchronous mode).

Moving to block 426, the relocation manager estimates the trend of each unit parameter and adds it to the unit repository; this operation is performed as above according to the values of the unit parameter that have been monitored over the same period (extracted from the unit repository) when they are significant for the corresponding data server (for example, always in case the unit parameter relates to consumed resources but only when the data unit has been stored in it for a time higher than a threshold, such as 1-10 days, in case the unit parameter relates to free resources or performance aspects). With reference now to block 428, the relocation manager identifies any recurring peaks of each unit parameter and adds them to the unit repository; in this case as well, the operation is performed as above according to the values of the unit parameter that have been monitored over the same period when they are significant for the corresponding data server. A test is then made at block 430, wherein the relocation manager verifies whether the unit parameters of a last data unit have been processed. If not, the flow of activity returns to the block 424 to repeat the same operations for a next data unit.

Conversely (once the unit parameters of all the data units have been processed, or in any case after the corresponding delay), the occurrence of any relocation condition (requiring the relocation of the data units) is verified. For this purpose, a (current) data unit of the database under management is taken into account at block 432 (starting from a first one in any arbitrary order). A (current) global area is then taken into account at block 434 (again starting from a first one in any arbitrary order). Continuing to block 436, the relocation manager forecasts the values in the future of each unit parameter of the global area; for example, a series of values of the unit parameter (such as every 1-60 min. in the next 1-12 months) is extrapolated according to the last value thereof that has been monitored and to its trend (extracted from the unit repository). The relocation manager then calculates a relocation function for the global area at block 438. For example, the relocation function is calculated from the values of the unit parameters of the global area in a predefined calculation period, comprising both the values that have been monitored (such as in the last 1-3 years) and the values that have been forecast. For this purpose, the values of each unit parameter (in the calculation period) are referred to their minimum value and maximum value (possibly multiplied by an adjustment factor) and then they are normalized to a common arbitrary unit (so as to make them homogenous); these normalized values of the unit parameters are then combined over time into a corresponding single value of the relocation function (for example, by simply summing them).

Referring now to block 440, the relocation manager determines one or more sample values of the relocation function; the sample values comprise the value of the relocation function at the moment (corresponding to the last monitoring of its unit parameters) and one or more values of the relocation function in the future (for example, after 2-4 months). The relocation manager compares the sample values at block 442 with a consolidated target defined in the same way as the relocation function, according to the targets corresponding to the unit parameters of the global area (extracted from the configuration repository). If at least one of the sample values exceeds the consolidated target (for example, it is (possibly strictly) higher or lower than it when the corresponding targets are all maximum values or minimum values, respectively), this means that the unit parameters of the global area do not fulfill the corresponding targets.

Conversely, the process proceeds into block 444 wherein the relocation manager determines one or more extreme values of the relocation function. For example, for this purpose one or more extreme values in the future are forecast for each unit parameter of the global area according to its recurring peaks and trend (such has by setting an extreme value every period of each recurring peak at its time, with a value extrapolated from the average value of the recurring peak according to the trend of the unit parameter); the extreme values of the relocation function are then defined by its values corresponding to each extreme value of the unit parameters. The relocation manager compares the extreme values of the relocation function with the same consolidated target at block 446. If at least one of the extreme values exceeds the consolidated target as above, again this means that the unit parameters of the global area do not fulfill the corresponding targets. Conversely, meaning that the unit parameters of the global area fulfill the corresponding targets, a test is made at block 448 wherein the relocation manager verifies whether a last global area has been processed. If not, the flow of activity returns to the block 434 to repeat the same operations for a next global area. Conversely, once all the global areas have been processed (meaning that the data unit does not cause any missing fulfillment of the targets), the process descends into block 450 wherein the relocation manager verifies whether a last data unit has been processed. If not, the flow of activity returns to the block 432 to repeat the same operations for a next data unit. Conversely, once all the data units have been processed, this means that no relocation condition has occurred for the whole database.

Returning to the block 442 or to the block 446, the relocation condition is instead detected when the unit parameters of the global area do not fulfill the corresponding targets. The use of the trends of the unit parameters allows predicting and preventing future problems to the database (for example, likely to occur within some days). Moreover, the use of the recurring peaks of the unit parameters allows predicting and preventing corresponding transient problems (for example, likely to occur only at specific times). This makes it possible to operate proactively by intervening in advance, before any problems actually occur. All of the above avoids (or at least significantly reduces) corresponding negative impacts, such as downtimes or performance degradations, on any applications supported by the database (and then on their service level).

In a completely independent way, the process passes from block 452 to block 454 as soon as the database enters any error condition (as detected by the collection agent monitoring the database manager); in response thereto, the relocation manager (notified accordingly by the collection agent) determines the missing fulfillment of the targets corresponding to the error condition (i.e., the unit parameters of the data units causing it), for example, by the collection agent querying the database manager.

In any case, a proposed relocation of the data units (for removing the missing fulfillment of the targets) is determined. For this purpose, the process descends into block 456 from the block 442 or the block 446 (in case of detection of the relocation condition) or from the block 454 (in case of error); at this point, a possible movement of each (critical) data unit causing the missing fulfillment of the targets is taken into account. The possible movement is determined by moving a percentage of the critical data unit from its (old) data server to any other (new) data server (starting from a first one in any arbitrary order); the percentage of the critical data unit to be moved starts from the movement granularity (extracted from the configuration repository) and it is increased by the same amount repeatedly up to the whole critical data unit. Continuing to block 458, the relocation manager estimates the values of the unit parameters of each (new) data unit resulting from this possible movement, i.e., the portion of the critical data unit that has been moved to the new data server and the possible portion of the critical data unit that has remained in the old data server. The unit parameters of the new data unit are determined according to the corresponding unit parameters of the critical data unit and to the corresponding machine parameters of its (new/old) data server that have been monitored over time (extracted from the unit repository and from the machine repository, respectively). For example, each unit parameter relating to a free resource of the new data unit is calculated according to the corresponding machine parameter relating to the free resource of its data server and to the corresponding unit parameter relating to the consumed resource of the critical data unit (scaled according to the percentage thereof forming the new data unit); moreover, each unit parameter relating to a performance aspect of the new data unit is calculated according to the corresponding machine parameter relating to the characteristics of its data server and to the corresponding unit parameter relating to the performance of the critical data unit (scaled according to the percentage thereof forming the new data unit).

At this point, the removal of the relocation condition following this possible movement of the critical data unit is verified. For this purpose, a (current) data unit is taken into account at block 460 (starting from each new data unit and then passing to the other data units in any arbitrary order). A (current) global area is then taken into account at block 462 (starting from the global area causing the missing fulfillment of the targets and then passing to the other global areas in any arbitrary order). The same operations described above are now repeated. Briefly, the relocation manager forecasts the values in the future of each unit parameter of the global area at block 464, calculates the relocation function for the global area at block 466, determines the sample values of the relocation function at block 468 and compares the sample values with the corresponding consolidated target at block 470. If none of the sample values exceeds the consolidated target, the relocation manager determines the extreme values of the relocation function at block 472 and compares the extreme values with the same consolidated target at block 474. If none of the extreme values exceeds the consolidated target, the relocation manager verifies at block 476 whether a last global area has been processed. If not, the flow of activity returns to the block 462 to repeat the same operations for a next global area; conversely, the relocation manager verifies at block 478 whether a last data unit has been processed. If not, the flow of activity returns to the block 460 to repeat the same operations for a next data unit. Conversely, this means that the relocation condition does not occur any longer; in this case, the process descends into block 480 wherein the relocation manager determines a candidate relocation adapted to become the proposed relocation (since it's capable of removing the missing fulfillment of the targets) according to this proposed movement. The process then descends into block 482; the same point is also reached directly from the block 470 or from the block 474 without performing any action if the relocation condition is detected (meaning that the possible movement of the critical data unit is not acceptable since it does not remove the missing fulfillment of the targets). In this case as well, the use of the trends of the machine/unit parameters allows discarding possible movements likely to cause future problems to the database. Moreover, the recurring peaks of the machine/unit parameters allows discarding possible movements likely to cause transient problems. This makes it possible to avoid taking into account possible movements that are acceptable at the moment but that may cause problems in the future.

In both cases, the relocation monitor verifies whether a last possible movement of the critical data unit has been verified. If not, the flow of activity returns to the block 456 to repeat the same operations for a next possible movement thereof. Conversely, once all the possible movements of the critical data unit (according to the movement granularity) have been verified, the relocation agent selects the proposed relocation of each critical data unit among the proposed relocations thereof at block 484; this operation is performed according to the corresponding optimization criteria (extracted from the configuration repository), for example, by maximizing the throughput of the hot tables according to the corresponding unit parameters. The process then descends into block 486; the same point is also reached directly from the block 450 if no relocation condition has occurred in the whole database. At this point, the relocation manager displays an (updated) representation of a status of the database. For example, the status comprises the representation of one or more aggregated parameters for each data unit; this representation may comprise a graphic for each global area, which plots the corresponding relocation function over (past, current and future) time against its consolidated target. Each graphic may be expanded to show each machine/unit parameter of the global area over time (against the corresponding targets for the unit parameters relating to free resources and performance aspects). This significantly facilitates the management of the database; particularly, the global areas aggregate the corresponding information thereby providing a very simple, intuitive and effective overall view of the status of the whole database (with any particular characteristics thereof that may be then analyzed further in detail if necessary). Moreover, a warning (for example, accompanied by an acoustic signal) is provided whenever any relocation condition has been detected or any error has occurred; the warning highlights its causes and indicates the proposed relocation that is suggested for removing it (for example, together with the same graphics as above based on the corresponding relocation functions that have been estimated). The flow of activity then returns to the block 402 waiting for a next expiration of the corresponding time-out.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for managing a database. However, the database may be of any type (for example, an object-oriented database).

In an embodiment, the database comprises one or more data units stored in one or more of a plurality of computing machines. However, the data units may be in any number and of any type (for example, raw data) and they may be stored in any number and type of computing machines (for example, virtual machines, personal computers) connected in any way (for example, in a LAN).

In an embodiment, the method comprises monitoring one or more machine parameters relating to operation of each computing machine over time. However, the machine parameters may be in any number and of any type (for example, relating to free resources, consumed resources, performance, data flow or any combination thereof, such as cached working memory, paged mass memory) and they may be monitored in any way (for example, in push or pull mode, on the data servers, on the management server or in any combination thereof).

In an embodiment, the method comprises monitoring one or more unit parameters relating to operation of each data unit on the corresponding computing machine over time. However, the unit parameters may be in any number and of any type, and they may be monitored in any way (either the same or different with respect to the machine parameters).

In an embodiment, the method comprises detecting a relocation condition corresponding to a missing fulfillment of one or more targets according to the monitored unit parameters. However, the targets may be in any number and of any type (for example, relating to load balancing, performance, data flow or any combination thereof) and the relocation condition may be detected in any way according to the monitored unit parameters (for example, only considering the unit parameters at the moment, their trend, their recurring peaks or any combination thereof, either taking into account or not corresponding monitored machine parameters too).

In an embodiment, the method comprises determining a proposed relocation of the data units in the computing machines (removing the missing fulfillment of the targets) according to the monitored machine parameters and the monitored unit parameters. However, the proposed relocation may be determined in any way (for example, only considering the unit and/or machine parameters at the moment, their trend, their recurring peaks or any combination thereof).

In an embodiment, the proposed relocation is for use in relocating the data units accordingly. However, the proposed relocation may be used in any (for example, with the data units that are relocated automatically, possibly after a manual confirmation).

In an embodiment, said step of monitoring one or more machine parameters comprises estimating a trend of each machine parameter according to the monitored machine parameter. However, the trend may be estimated in any way (for example, by best fitting the monitored machine parameter to any suitable curve, even not known a priori, and then extending it to the future) and it may be used only for detecting the relocation condition, only for determining the proposed relocation or for both of them; in any case, a basic implementation without this feature is contemplated.

In an embodiment, said step of detecting a relocation condition comprises detecting the relocation condition according to the trends of the machine parameters. However, the relocation condition may be detected in any way (for example, by analyzing the obtained curve analytically).

In an embodiment, said step of determining a proposed relocation comprises determining the proposed relocation according to the trends of the machine parameters. However, the proposed relocation may be determined in any way (for example, in this case as well analytically).

In an embodiment, said step of monitoring one or more unit parameters comprises estimating a trend of each unit parameter according to the monitored unit parameter. However, the trend may be estimated in any way (either the same or different with respect to the machine parameters) and it may be used only for detecting the relocation condition, only for determining the proposed relocation or for both of them (in addition or in alternative to the use of the trends of the machine parameters); in any case, a basic implementation without this feature is contemplated.

In an embodiment, said step of detecting a relocation condition comprises detecting the relocation condition according to the trends of the unit parameters. However, the relocation condition may be detected in any way (either the same or different with respect to the machine parameters).

In an embodiment, said step of determining a proposed relocation comprises determining the proposed relocation according to the trends of the unit parameters. However, the proposed relocation may be determined in any way (either the same or different with respect to the machine parameters).

In an embodiment, said step of monitoring one or more machine parameters comprises identifying one or more recurring peaks of each machine parameter according to the monitored machine parameter. However, the recurring peaks may be identified in any way (for example, only when they repeat at least for a predefined number of times) and they may be used only for detecting the relocation condition, only for determining the proposed relocation or for both of them (in addition or in alternative to the trends of the machine parameters and/or the trends of the unit parameters); in any case, a basic implementation without this feature is contemplated.

In an embodiment, said step of detecting a relocation condition comprises detecting the relocation condition according to the recurring peaks of the machine parameters. However, the relocation condition may be detected in any way (for example, by updating the corresponding curve accordingly and then analyzing it analytically as above).

In an embodiment, said step of determining a proposed relocation comprises determining the proposed relocation according to the recurring peaks of the machine parameters. However, the proposed relocation may be determined in any way (for example, in this case as well analytically).

In an embodiment, said step of monitoring one or more unit parameters comprises identifying one or more recurring peak of each unit parameter according to the monitored unit parameter. However, the recurring peaks may be identified in any way (either the same or different with respect to the machine parameters) and they may be used only for detecting the relocation condition, only for determining the proposed relocation or for both of them (in addition or in alternative to the trends of the machine parameters, the trends of the unit parameters and/or the recurring peaks of the machine parameters); in any case, a basic implementation without this feature is contemplated.

In an embodiment, said step of detecting a relocation condition comprises detecting the relocation condition according to the recurring peaks of the unit parameters. However, the relocation condition may be detected in any way (either the same or different with respect to the machine parameters).

In an embodiment, said step of determining a proposed relocation comprise determining the proposed relocation according to the recurring peaks of the unit parameters. However, the proposed relocation may be determined in any way (either the same or different with respect to the machine parameters).

In an embodiment, said step of detecting a relocation condition comprises calculating one or more relocation functions each one depending on a corresponding set of one or more of the unit parameters. However, the relocation functions may be in any number, each one for any number and type of unit parameters (for example, relating to network traffic); moreover, the relocation functions may be calculated in any way (for example, by weighting the corresponding unit parameters or by combining them non-linearly).

In an embodiment, said step of detecting a relocation condition comprises comparing each relocation function with a corresponding target function depending on a set of one or more of the targets corresponding to the unit parameters of the relocation function. However, the target functions may be calculated in any way (either the same or different with respect to the corresponding relocation functions) and they may be compared with the relocation functions in any way (for example, analytically); in any case, any other type of comparison of the unit parameters with the targets is contemplated (for example, directly between each target and the corresponding unit parameter).

In an embodiment, said step of determining a proposed relocation comprises determining one or more candidate relocations adapted to become the proposed relocation. However, the candidate relocations may be determined in any way (for example, only accepting the ones removing the missing fulfillment of the targets with a certain safety degree, such as a difference between each relocation function and the corresponding target function higher, possibly strictly, than a corresponding threshold).

In an embodiment, said step of determining a proposed relocation comprises selecting the proposed relocation among the candidate relocations according to one or more optimization criteria. However, the optimization criteria may be in any number, of any type (for example, minimum network traffic, minimum average response time, minimum average mass memory accesses) and at any level (for example, for the whole database); moreover, the optimization criteria may also be independent of the database (for example, a predefined ordered list of preferred data servers). In any case, the possibility is not excluded of determining the proposed relocation directly (for example, as soon as a first candidate relocation is found).

In an embodiment, said step of determining one or more candidate relocations comprises verifying the fulfillment of the targets according to the monitored unit parameters and the monitored machine parameters for each possible movement of each critical one of the data units (causing the missing fulfillment of the targets) from the corresponding computing machine to a different one of the computing machines. However, the possible movements may be in any number and of any type (for example, only complete, only partial or any combination thereof).

In an embodiment, each possible movement is a complete movement and/or a partial movement with a predefined granularity. However, the granularity of the partial movements may have any value (in absolute terms or in relative terms, either the same for all the data units or specific for each one of them); in any case, the search (starting from the lowest partial possible movement) may be stopped as soon as a candidate relocation is found (so as to minimize the impact on the database).

In an embodiment, the following steps are performed in response to an error condition of the database. However, the error condition may be of any type (for example, only relating to critical situations causing a failure of the database or also comprising warnings simply relating to performance degradations thereof).

In an embodiment, in this case the method comprises determining the missing fulfillment of the targets corresponding to the error condition. However, the missing fulfillment of the targets may be determined in any way (for example, according to predefined rules based on error codes).

In an embodiment, in this case the method comprises triggering said determining a proposed relocation. However, the determination of the proposed relocation may be triggered in response to any condition (for example, only in case of errors, only proactively in case of relocation conditions or in any combination thereof).

In an embodiment, the method comprises displaying an indication of the proposed relocation. However, the proposed relocation may be displayed in any form (for example, text and/or images) and in any way (for example, printed).

In an embodiment, the method comprises aggregating the monitored machine parameters of each computing machine and/or the monitored unit parameters of each data unit into one or more aggregated parameters over time. However, the aggregated parameters may be in any number and of any type (for the unit parameters only, the machine parameters only or any combination thereof), and they may be additional, different or alternative with respect to the above-mentioned relocation functions (for example, by calculating, for each data unit, an aggregated parameter for all its resource consumptions, an aggregated parameter for all the free resources of its data server and an aggregated parameter for its overall data flow).

In an embodiment, the method comprises displaying an indication of the aggregated parameters. However, the aggregated parameters may be displayed in any form and in any way (either the same or different with respect to the proposed relocation).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

An embodiment provides a computer program configured for causing a computing system to perform the above-mentioned method when the computer program is executed on the computing system. An embodiment provides a computer program product, the computer program product comprising a computer readable storage medium having program instructions embodied therewith, the program instructions being executable by a computing system to cause the computing system to perform the same method. However, the software program may be implemented as a stand-alone module, as a plug-in for a pre-existing software program (for example, the database manager), or even directly in the latter; moreover, the software program may run on any computing system (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a system comprising means configured for performing each one of the steps of the above-mentioned method. An embodiment provides a system comprising a circuitry (i.e., any hardware suitably configured, for example, by software) configured for performing each one of the steps of the same method. However, the system may be of any type (for example, a dedicated server or the same server of the database manager).

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention.

It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for managing a database, the database comprising one or more data units stored in one or more of a plurality of data servers, wherein the method comprises:
    monitoring, in response to a request from a relocation server, one or more machine parameters relating to operation of a first data server of the plurality of data servers over time,
    monitoring one or more unit parameters relating to operation of each data unit on the first data server over time, wherein the one or more unit parameters relate to trends for respective consumed resources,
    detecting a relocation condition corresponding to a missing fulfillment, at the first data server, of one or more targets according to the monitored unit parameters,
    determining a proposed relocation at a second data server via:
        relocating a first percentage of the one or more data units from the first data server to the second data server,
        estimating values of each unit parameter at the first data server and the second data server after relocating the first percentage of the one or more data units;
        relocating a second percentage of the one or more data units from the first data to the second data server, wherein the second percentage of data units is increased from the first percentage of data units,
        estimating values of each unit parameter at the first data server and the second data server after relocating the second percentage of the one or more data units;
    verifying a fulfillment of the targets according to monitored unit parameters and the monitored machine parameters at the second data server based on the estimating, and
    determining a relocation of a balance of the data units from the first data server to the second data server based on the verification.

2. The method according to claim 1, wherein said monitoring one or more machine parameters comprises:
    estimating a trend of each machine parameter according to the monitored machine parameter,
    and wherein said detecting a relocation condition comprises:
    detecting the relocation condition according to the trends of the machine parameter, and/or said determining a proposed relocation comprises:
    determining the proposed relocation according to the trends of the machine parameters.

3. The method according to claim 1, wherein said monitoring one or more unit parameters comprises:
    estimating a trend of each unit parameter according to the monitored unit parameter, and wherein said detecting a relocation condition comprises:
    detecting the relocation condition according to the trends of the unit parameters, and/or said determining a proposed relocation comprises:
    determining the proposed relocation according to the trends of the unit parameters.

4. The method according to claim 1, wherein said monitoring one or more unit parameters comprises:
    identifying one or more recurring peaks of each unit parameter according to the monitored unit parameter, and wherein said detecting a relocation condition comprises:
    detecting the relocation condition according to the recurring peaks of the unit parameters, and/or said determining a proposed relocation comprises:
determining the proposed relocation according to the recurring peaks of the unit parameters.

5. The method according to claim 1, wherein said detecting a relocation condition comprises:
calculating one or more relocation functions, each one depending on a corresponding set of one or more of the unit parameters, and
comparing each relocation function with a corresponding target function depending on a set of one or more of the targets corresponding to the unit parameters of the relocation function.

6. The method according to claim 1, wherein said determining a proposed relocation comprises:
determining one or more candidate relocations adapted to become the proposed relocation, and
selecting the proposed relocation among the candidate relocations according to one or more optimization criteria.

7. The method according to claim 1, in response to an error condition of the database, the method comprising:
determining the missing fulfillment of the targets corresponding to the error condition, and
triggering said determining a proposed relocation.

8. The method according to claim 1, further comprising displaying an indication of the proposed relocation.

9. The method according to claim 1, further comprising aggregating the monitored machine parameters of each computing machine data server of the plurality of data servers and/or the monitored unit parameters of each data unit into one or more aggregated parameters over time and displaying an indication of the aggregated parameters.

10. A computer program product, the computer program product comprising a computer readable storage medium having program instructions embodied therewith, the program instructions being executable by a computing system to cause the computing system to perform a method for managing a database, the database comprising one or more data units stored in one or more of a plurality of data servers, wherein the method comprises:
monitoring, in response to a request from a relocation server, one or more machine parameters relating to operation of each data server of the plurality of data servers over time,
monitoring one or more unit parameters relating to operation of each data unit on the the first data server over time, wherein the one or more unit parameters relate to trends for respective consumed resources,
detecting a relocation condition corresponding to a missing fulfillment, at the first data server, of one or more targets according to the monitored unit parameters, and
determining a proposed relocation at a second data server via:
relocating a first percentage of the one or more data units from the first data server to the second data server,
estimating values of each unit parameter at the first data server and the second data server resulting from the relocating the first percentage of the one or more data units;
relocating a second percentage of the one or more data units from the first data to the second data server, wherein the second percentage of data units is increased from the first percentage of data units,
estimating values of each unit parameter at the first data server and the second data server after relocating the second percentage of the one or more data units;
verifying a fulfillment of the targets according to monitored unit parameters and the monitored machine parameters at the second data server based on the estimating, and
determining a relocation of a balance of the data units from the first data server to the second data server based on the verification.

11. A system for managing a database, the database comprising one or more data units stored in one or more of a plurality of computing machines, wherein the system comprises:
a circuitry for monitoring one or more machine parameters relating to operation of each computing machine over time,
a circuitry for monitoring one or more unit parameters relating to operation of each data unit on the corresponding computing machine over time, wherein the one or more unit parameters relate to trends for respective consumed resources and,
a circuitry for detecting a relocation condition corresponding to a missing fulfillment of one or more targets according to the monitored unit parameters, and
a circuitry for determining a proposed relocation, verifying a fulfillment of the targets according to monitored unit parameters and the monitored machine parameters at the different computing machine based on the relocation of the percentage of the one or more data units, and determining a relocation of a balance of the data units from the corresponding computing machine to the different computing machine based on the verification,
wherein determining the proposed relocation comprises:
relocating a first percentage of the one or more data units from the first data server to the second data server,
estimating values of each unit parameter at the first data server and the second data server resulting from the relocating of the first percentage of the one or more data units;
relocating a second percentage of the one or more data units from the first data to the second data server, wherein the second percentage of data units is increased from the first percentage of data units, and
estimating values of each unit parameter at the first data server and the second data server resulting from the relocating of the second percentage of the one or more data units.

12. The method according to claim 1, wherein said monitoring one or more machine parameters comprises:
identifying one or more recurring peaks of each machine parameter according to the monitored machine parameter,
and wherein said detecting a relocation condition comprises:
detecting the relocation condition according to the recurring peaks of the machine parameters,
and/or said determining a proposed relocation comprises:
determining the proposed relocation according to the recurring peaks of the machine parameters.

13. The computer program product according to claim 10, wherein said monitoring one or more machine parameters comprises:

identifying one or more recurring peaks of each machine parameter according to the monitored machine parameter,
and wherein said detecting a relocation condition comprises:
detecting the relocation condition according to the recurring peaks of the machine parameters,
and/or said determining a proposed relocation comprises:
determining the proposed relocation according to the recurring peaks of the machine parameters.

14. The system according to claim 11, wherein said monitoring one or more machine parameters comprises:
identifying one or more recurring peaks of each machine parameter according to the monitored machine parameter,
and wherein said detecting a relocation condition comprises:
detecting the relocation condition according to the recurring peaks of the machine parameters,
and/or said determining a proposed relocation comprises:
determining the proposed relocation according to the recurring peaks of the machine parameters.

* * * * *